Figure 1:
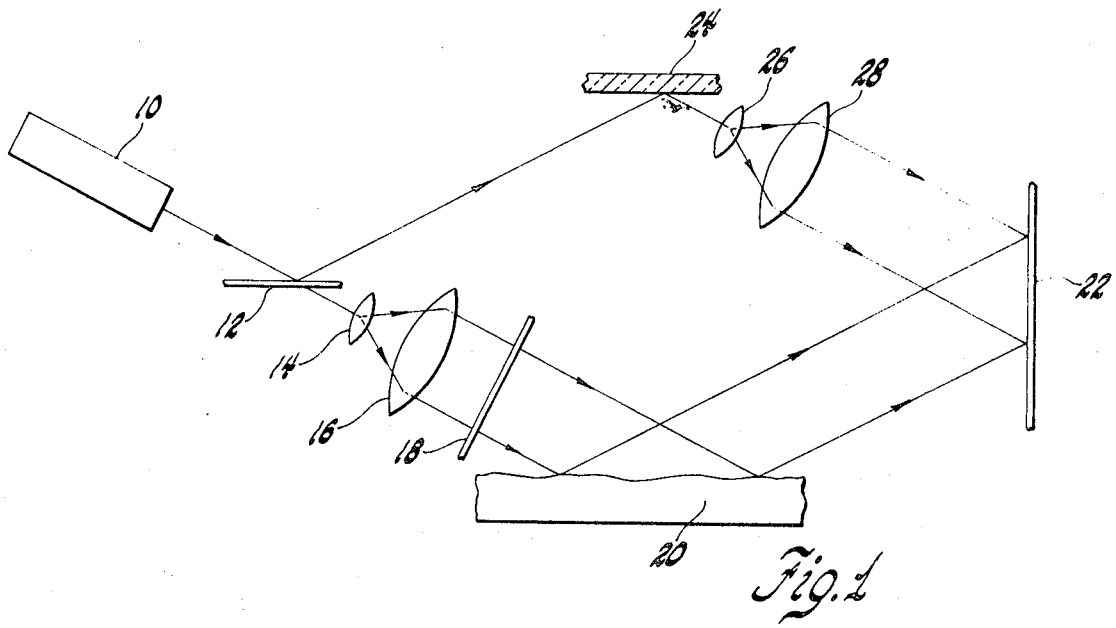

United States Patent
Upatnieks et al.

[11] 3,748,048
[45] July 24, 1973

[54] METHOD OF DETECTING CHANGES OF A SPECULAR SURFACE

[75] Inventors: Juris Upatnieks, Ann Arbor; Philip V. Mohan, Birmingham, both of Mich.

[73] Assignee: General Motors Corporation, Detroit, Mich.

[22] Filed: Nov. 1, 1971

[21] Appl. No.: 194,734

[52] U.S. Cl. .................... 356/212, 356/168, 350/3.5
[51] Int. Cl. ............................................. G01n 21/48
[58] Field of Search .................... 350/3.5; 356/212, 356/168

[56] References Cited
UNITED STATES PATENTS
3,619,065   11/1971   Agnew ........................... 356/168 X
3,668,405    6/1972   Brooks et al. ................... 350/3.5 X OTHER PUBLICATIONS
"Mask Defect Detection by Holograms" by Laming et al., IBM Tech. Disc. Bltn., Vol. 14, No. 1, June 1971.

Primary Examiner—Ronald L. Wibert
Assistant Examiner—Paul K. Godwin
Attorney—Jean L. Carpenter, Warren D. Hill et al.

[57] ABSTRACT

A method of detecting small dimensional surface changes in a specular object or of comparing two nearly identical specular objects comprises illuminating a holographic plate by a plane reference wave and by an object wave produced by specularly reflecting a plane illuminating wave from the object and then illuminating the developed hologram with the conjugate of the reference wave so that the real object image is formed on the object. The light specularly reflected from the object will be a plane wave except to the extent that changes in the object surface have taken place. The nearly planar reflected wave is compared to a plane wave to detect the surface changes. Preferably, the object is originally illuminated by a patterned plane wave so that the final wave reflected from the object during reconstruction can be compared to a negative transparency of the pattern whereby surface changes are readily apparent.

4 Claims, 2 Drawing Figures

PATENTED JUL 24 1973

3,748,048

INVENTORS
Juris Upatnieks &
BY Philips V. Mohan

Warren D. Hill
ATTORNEY

METHOD OF DETECTING CHANGES OF A SPECULAR SURFACE

This invention relates to a method of detecting changes in a specular surface or differences in similar surfaces by holography.

Previously it has been difficult to detect small dimensional deviations in surfaces due to wear or deformation, for example, particularly where the object is large or has a complex contour. This is overcome for specular objects by the present invention.

A typical hologram is a photographic record of the pattern of interference between a simple light wave (reference wave) and a more complicated wave modified by the interaction with an object (object wave). It is well known that in reconstructing an image from the hologram that a conjugate reference wave (the same as the original wave but traveling in the opposite direction) constructs a conjugate object wave in a holographic system. Since the conjugate of a plane wave is another plane wave traveling in the opposite direction, the use of such a wave simplifies the system. A conjugate reference wave is commonly used to produce a real image of the object.

In this method a plane or other simple wave is used to illuminate the object during hologram construction. During reconstruction with the conjugate of the original reference beam, light traveling from the hologram to form the real image is reflected from the object giving another plane or simple wave traveling in the opposite direction. It will differ from the original illuminating wave only in regions of deformation of the object. It can be compared with the original wave interferometrically to indicate such regions of deformation. If the original wave illuminating the object has a pattern superimposed on it, the deformation will give changes in the pattern.

An object of this invention then is to provide a method for holographically detecting changes in a specular surface by reducing a complex wavefront to a simple wavefront which is readily analyzed to detect surface changes.

A further object of the invention is to provide a method for holographically detecting changes in large or complex specular surfaces.

This invention is carried out by constructing a hologram of a specular object using simple, preferably plane, waves to illuinate the object and to serve as the reference wave. Where it is later desired to inspect the object for surface changes due to wear or deformation or to compare the original with another nearly identical object, the object image is reconstructed by illuminating the hologram with the conjugate of the reference wave so that the real image is directed onto the object and reflected therefrom to produce a wave like the original illuminating wave except for those regions where deformation has occurred in the object. Finally, the reflected wave is analyzed to detect regions of deformation of the object. Preferably the object is originally illuminated with a patterned plane wave so that the final reflected wave from the object will bear the same pattern except for readily identified abberations due to deviations of object surfaces.

Figure 2:
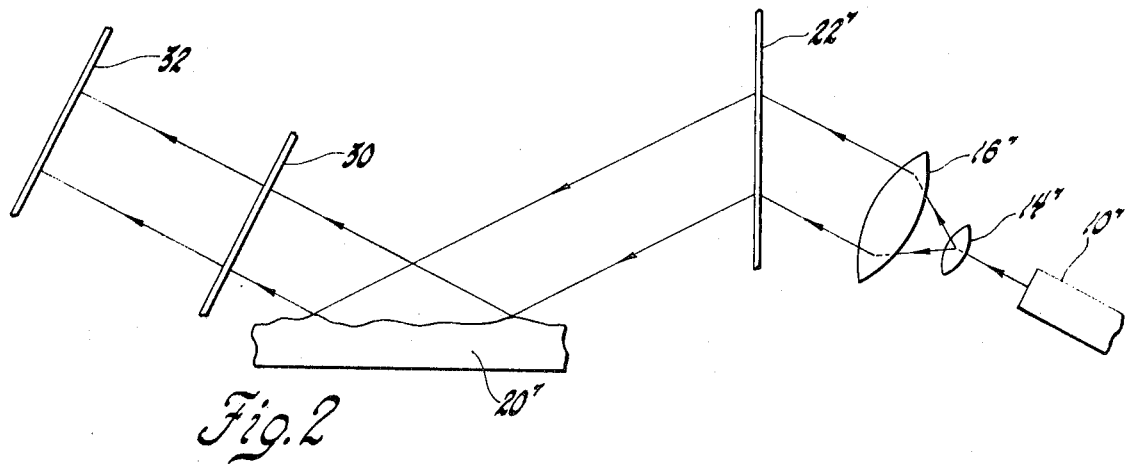

The above and other advantages will be made more apparent from the following specification taken in conjunction with the accompanying drawings wherein like reference numerals refer to like parts and wherein:

FIG. 1 is a diagrammatic representation of a system for constructing the hologram of a specular object according to the invention; and, FIG. 2 is a diagrammatic representation of a system for reconstructing the hologram of FIG. 1 and for detecting changes in the object according to the invention.

In FIG. 1 the optical system for constructing a hologram comprises a laser 10 which projects a beam of light to a beam splitter 12. A portion of that beam passes through the beam splitter to an expanding lens 14 which projects a diverging beam onto a collimating lens 16. The collimated beam then passes through a patterned mask 18 and onto the specular surface of an object 20 which reflects the beam onto a photographic plate 22. Another portion of the laser beam is reflected from the beam splitter 12 to mirror 24 and through an expanding lens 26 and a collimating lens 28 to provide a plane reference wave projected onto the plate 22. The mask is of any pattern in which distortions thereof are readily detected by observation. The mask may be, for example, a window screen or a transparency of a grid pattern.

FIG. 2 illustrates the reconstruction of an image from the hologram 22' which was formed by the development of the exposed photographic plate 22. A laser 10' projects a beam through an expanding lens 14' and a collimating lens 16' onto the hologram 22' in such a direction that the plane waves reaching the hologram 22' are the conjugate of the plane reference beam used during hologram construction. The object 20' which has experienced some wear, deformation or other surface change since the time of hologram construction or is another object nearly identical to the original object 20, is placed so that the real image of the object registers on the object and is reflected therefrom through a mask 30 and onto a viewing screen 32. The mask 30 is a negative transparency of the mask 18 used during construction. If the object 20' is identical to object 20, the light reflected therefrom onto the mask 30 will bear the exact pattern of the mask 18 so that no light will be transmitted through the mask 30 onto the screen 32. However, to the extent the object 20' differs from the object 20, the pattern reflected onto the mask 30 will be deformed in those regions where the surface of the object 20' is deformed so that some light will pass the transparent portions of the mask 30 and will be projected onto the screen 32 such that the regions of the surface deformation of the object 20' will be readily apparent by viewing the screen. Alternatively, the mask 30 may be omitted so that the entire pattern reflected onto the screen 32 from the object 20' will be visually examined to determine what changes, if any, have taken place in the surface of the object. In a second alternate form of the invention, both mask 18 and 30 are omitted so that the beam reflected from the object 20' is free of any superimposed pattern. In that case, the reflected beam will be a plane wave if the objects 20 and 20' are identical and will deviate from a plane wave to an extent corresponding to the regions of the surface change. This deviation is then detected by interferometrically comparing the reflected wave with a plane wave.

It is not essential to use plane waves for construction or reconstruction of the hologram since other simple waves will suffice. Generally, however, plane waves will be most convenient for execution and analysis of surface deviations.

It will be seen that the object surface must be sufficiently specular to effect sufficient reflection of the object image for analysis. Thus the method is not suitable for detecting dimensional changes in highly diffuse surfaces but on the other hand, it is not required that the surface be perfectly specular. Accordingly, the term "specular" as used herein means capable of reflecting a beam adequate for analysis.

A particular advantage of the method of this invention is that inspection of large surfaces as well as complex surfaces is easily carried out. This method also has the advantage of reducing a complex wavefront such as the original object wave or a reconstructed object wave to a simple wavefront so that deviations are readily apparent.

The embodiment of the invention described herein is for purposes of illustration and the scope of the invention is intended to be limited only by the following claims.

It is claimed:

1. The method of comparing one specular surface with another nearly identical specular surface comprising the steps of
    illuminating one specular surface with a simple wave of coherent light,
    constructing a hologram by illuminating a holographic plate with a simple reference wave of coherent light and with light specularly reflected from the surface.
    developing the hologram,
    reconstructing the surface image by illuminating the hologram with the conjugate of the reference wave so that the real surface image is directed onto the other surface and reflected therefrom to produce a wave identical to the original surface illuminating wave to the extent the two surfaces are identical,
    and analyzing the reflected wave to determine its deviation from the original illuminating wave to therefore detect differences in the surface.

2. The method of detecting surface deformation of a specular object comprising the steps of
    illuminating a specular object prior to deformation with a plane wave of coherent light,
    constructing a hologram by illuminating a holographic plate with a plane reference wave of coherent light and with light specularly reflected from the object,
    developing the hologram,
    after object deformation reconstructing the object image by illuminating the hologram with the conjugate of the reference wave so that the real object image is directed onto the deformed object and reflected therefrom to produce a wave which is planar to the extent the object surface has not changed since the time of hologram construction,
    and analyzing the reflected wave to determine its in the object.

3. The method of detecting surface deformation of a specular object comprising the steps of
    superimposing a pattern on a plane wave of coherent light,
    illuminating a specular object prior to deformation with the plane wave bearing the superimposed pattern,
    constructing a hologram by illuminating a holographic plate with a plane reference wave of coherent light and with light specularly reflected from the object,
    developing the hologram,
    after object deformation reconstructing the object image by illuminating the hologram with the conjugate of the reference wave so that the real object image is directed onto the object and reflected therefrom to produce a resultant patterned wave identical to the original patterned wave to the extent the object surface has not changed since the time of hologram construction,
    and comparing the pattern carried by the resultant patterned wave with the original pattern to detect surface changes in the object.

4. The method of detecting surface deformation of a specular object comprising the steps of
    superimposing a pattern on a plane wave of coherent light,
    illuminating a specular object prior to deformation with the plane wave bearing the superimposed pattern,
    constructing a hologram by illuminating a holographic plate with a plane reference wave of coherent light and with light specularly reflected from the object,
    developing the hologram,
    after object deformation reconstructing the object image by illuminating the hologram with the conjugate of the reference wave so that the real object image is directed onto the object and reflected therefrom to produce a resultant patterned wave identical to the original patterned wave to the extent the object surface has not changed since the time of hologram construction,
    and comparing the pattern carried by the resultant patterned wave with the original pattern to detect surface changes in the object by projecting the resultant patterned wave onto a mask bearing a pattern which is the negative of the superimposed pattern so that only portions of the patterned wave corresponding to surface changes pass through the mask.

* * * * *